US007620689B2

(12) United States Patent
LoBuono et al.

(10) Patent No.: US 7,620,689 B2
(45) Date of Patent: Nov. 17, 2009

(54) REAL TIME COMMUNICATIONS SYSTEM

(75) Inventors: Joseph LoBuono, Delray Beach, FL (US); Johannes Ruetschi, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 910 days.

(21) Appl. No.: 10/894,170

(22) Filed: Jul. 19, 2004

(65) Prior Publication Data

US 2006/0031331 A1 Feb. 9, 2006

(51) Int. Cl.
*G06F 15/16* (2006.01)
(52) U.S. Cl. .................. 709/206; 709/204; 709/205; 709/207; 709/223; 709/224
(58) Field of Classification Search ......... 709/204–207, 709/223–227
See application file for complete search history.

(56) References Cited

U.S. PATENT DOCUMENTS

| | | | | |
|---|---|---|---|---|
| 6,434,599 | B1 * | 8/2002 | Porter | 709/204 |
| 6,484,196 | B1 * | 11/2002 | Maurille | 709/206 |
| 6,539,385 | B1 * | 3/2003 | Pollack et al. | 707/10 |
| 6,731,323 | B2 * | 5/2004 | Doss et al. | 348/14.01 |
| 7,110,510 | B1 * | 9/2006 | Shaffer et al. | 379/88.25 |
| 7,185,059 | B2 * | 2/2007 | Daniell et al. | 709/206 |
| 7,475,110 | B2 * | 1/2009 | Kirkland et al. | 709/204 |
| 7,512,659 | B2 * | 3/2009 | Keohane et al. | 709/206 |
| 2003/0063121 | A1 * | 4/2003 | Kumhyr et al. | 345/751 |
| 2004/0017396 | A1 * | 1/2004 | Werndorfer et al. | 345/751 |
| 2004/0054737 | A1 * | 3/2004 | Daniell | 709/206 |
| 2004/0078448 | A1 * | 4/2004 | Malik et al. | 709/206 |
| 2004/0128356 | A1 * | 7/2004 | Bernstein et al. | 709/206 |
| 2004/0186896 | A1 * | 9/2004 | Daniell et al. | 709/207 |
| 2004/0254998 | A1 * | 12/2004 | Horvitz | 709/206 |
| 2005/0027779 | A1 * | 2/2005 | Schinner | 709/200 |
| 2005/0078677 | A1 * | 4/2005 | Benting et al. | 370/390 |
| 2005/0080852 | A1 * | 4/2005 | Kelley et al. | 709/206 |
| 2005/0080864 | A1 * | 4/2005 | Daniell | 709/206 |
| 2006/0168026 | A1 * | 7/2006 | Keohane et al. | 709/206 |
| 2006/0212286 | A1 * | 9/2006 | Pearson et al. | 704/9 |
| 2007/0112915 | A1 * | 5/2007 | Klassen et al. | 709/206 |
| 2007/0124405 | A1 * | 5/2007 | Ulmer et al. | 709/207 |
| 2008/0313292 | A1 * | 12/2008 | Forstall et al. | 709/206 |

OTHER PUBLICATIONS

Malik et al, "Initiating Instant Messaging (IM) Chat Sessions From Email Messages", United States Patent Application Publication US2004/078448 A1, publication date Apr. 22, 2004.
Search Report including Notification of Transmittal of the International Search Report, International Search Report, and Written Opinion of the International Searching Authority.

* cited by examiner

*Primary Examiner*—Ario Etienne
*Assistant Examiner*—Brendan Y Higa

(57) ABSTRACT

A real-time communications system of networked communications devices, method and program product for operating such a system. E-mail activity is, monitored for e-mail exchange threads. Selected threads are identified and a prompt to switch to an IM session is sent to a local e-mail recipient. If the recipient elects to continue the exchange in an instant messaging (IM) session, the substance of the thread is copied to the IM session and the exchange continues.

20 Claims, 2 Drawing Sheets

REAL TIME COMMUNICATIONS SYSTEM

BACKGROUND OF THE INVENTION

1. Field of the Invention

The present invention is related to a real time on line communications and more particularly to on line text messaging.

2. Background Description

Personal productivity applications or tools are well known and readily available for everyday use. Examples of such personal productivity tools include state of the art communications tools such as instant messaging applications and e-mail, as well as personal information manager (PIM) software. These personal productivity tools are available as individual stand alone applications (e.g., America Online (AOL) Instant Messenger (AIM) from AOL, Eudora from Qualcomm Inc., and Palm Desktop from Palm, Inc.) or, integrated in a single office suite, e.g., Microsoft (MS) Outlook in MS Office from Microsoft Corporation. Further, personal productivity tools are available for a wide range of platforms, ranging from small hand held devices such as what are known as personal digital assistants (PDAs) and web enabled or third generation (3G) cell phones to larger personal computers (PCs) and even to distributed or Internet based platforms. These personal productivity applications can streamline communications and improve user productivity and, when used selectively, can realize significant cost savings by reducing wasted resources.

For example e-mail is most effective in fire and forget type communications, where each e-mail message is sent for receipt at some subsequent time, e.g., an hour later, several hours later, days later and etc. Each e-mail message requires significant overhead, e.g., a sender e-mail address, a recipient e-mail address, a transmission path, a subject, a salutation, the message (as few as one or more words), a close that may include a transmission warning or disclaimer. Very often each e-mail includes previous messages in an e-mail exchange, which further bloats the size of the each message. Instant messaging (IM) is most effective for real time private chat with rapid fire contemporaneous queries and responses being sent and received. Once an IM connection is made, only the message content need to be sent. So, by contrast instant messaging is low overhead.

If a comment is IM'ed and a response follows several hours later, the response may be missed completely. Likewise an e-mail exchange, especially of short messages, may take significantly longer, e.g., hours, and consume a higher level of system resources to convey what might be IM'ed in a few minutes. Often, for example, rather than continue to exchange e-mails, one party may grow weary and just phone the other to complete the exchange conversation. As a result system resources are wasted rather than conserved.

Thus, there is a need for a way to efficiently communicate in real time without wasting available resources.

SUMMARY OF THE INVENTION

It is a purpose of the invention to efficiently communicate in real time;

It is another purpose of the invention to reduce wasted system resources in real time communications systems.

The present invention relates to a real-time communications system of networked communications devices, method and program product for operating such a system. E-mail activity is monitored for e-mail exchange threads. Selected threads are identified and a prompt to switch to an IM session is sent to a local e-mail recipient. If the recipient elects to continue the exchange in an instant messaging (IM) session, the substance of the thread is copied to the IM session and the exchange continues.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
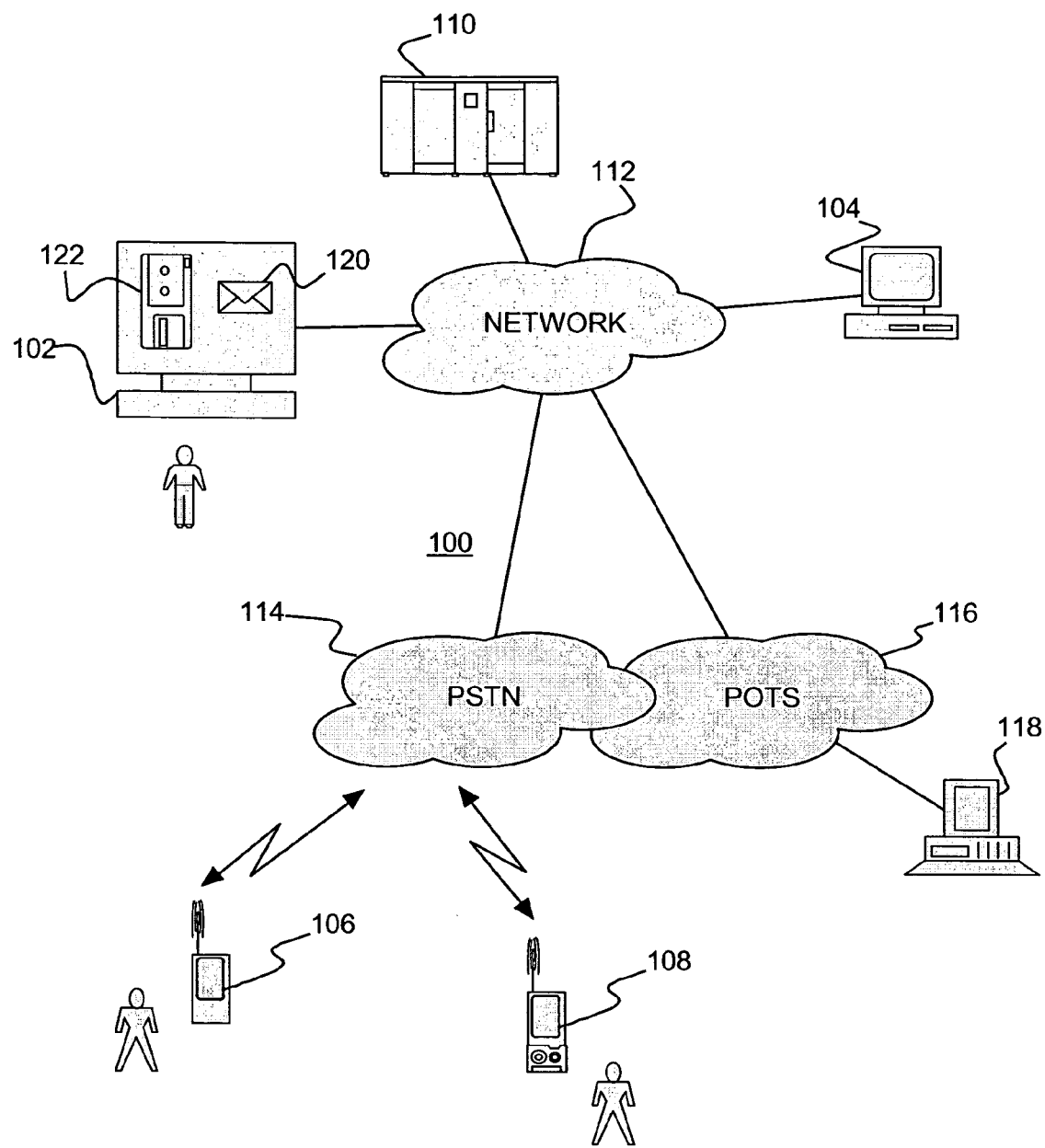
FIG. 1 shows an example of a preferred embodiment real-time communications system according to the present invention.

Turning now to the drawings and, more particularly, FIG. 1 shows an example of a preferred embodiment real-time communications system 100 which may be a multi-platform communications system, such as OpenScape™ application from Siemens Information and Communications Networks, Inc. See generally, *OpenScape V1.0, Technical White Paper*, Siemens Information and Communication Networks, Inc., 2003. The real-time communications system 100 serves users connected on communications devices 102, 104, 106, 108 that may be distributed over a wide geographic area. Communications devices 102 and 104 connect, e.g., to an e-mail server 110 over a network 112 that may be a local area network (LAN), the Internet, an intranet or a combination thereof. The e-mail server 110 may be any suitable public or private e-mail server and may also include a private instant messaging (IM) facility. Wireless communications devices 106 and 108 connect over a public switched telephone network (PSTN) 114 to the network 112. Also, remote users may connect telephonically over a typical telephone network 116, e.g., from a home computer or terminal 118 over the plain old telephone system (POTS) 116. Communications devices 102, 104, 106, 108, 118, each have an e-mail capability 120 interfacing with the e-mail server 110 and an IM capability 122.

At least one communications device, e.g., personal computer 102, includes a preferred automated transition service that monitors e-mail activity for conversation threads, e.g., a series of e-mails exchanged between at least two common e-mail addresses (one a sender/recipient and the other a recipient/sender address) and occurring in fairly rapid succession or within a relatively short period of time. Upon identifying a conversation thread, the automated transition service automatically offers users involved in the thread (or at least the user at the particular communications device 102) with an opportunity to transfer the thread to instant messaging, e.g., with an on-screen pop-up box. If a user indicates acceptance, an IM session opens and the thread is seamlessly transferred to the IM session. Since each of the communications devices 102, 104, 106, 108, 116 may have multiple IM applications at least some of which may be based on different IM protocols, IM sessions based on a common IM protocol are started on each participating device. Preferably, the related e-mail text is also seamlessly transferred to the IM session and may be further provided to each user included in the IM session. Thereafter, users can continue the exchange as an IM session.

Distributed communications devices may include one or more personal computers or computer terminals 102, 104, 118 or wireless devices 106, 108. Personal computers 102, 104, 118 may include any number of suitable general purpose stand alone computers, such as, for example, desktop computers, notebook computers, tablet computers and the like. Wireless devices 106, 108 may include for example, a wireless capable PDA personal digital assistant (PDA) 106 or an Internet capable cell phone 108. Further, wireless capability may include, for example, wireless LAN (WLAN) or Wi-Fi connections such as an IEEE 802.11a or 802.11b adapter, cell phone capability or Bluetooth. As noted hereinabove, participating communications devices 102, 104, 106, 108, 118, each have at least one (and not necessarily the same) suitable e-mail facility and, preferably, a suitable IM capability based on a common IM protocol. Examples of a suitable e-mail facility include for example, Microsoft Outlook, Outlook Express, Eudora from Qualcomm Inc. and Mozilla Thunderbird from the Mozilla Foundation. Examples of suitable IM capabilities include America Online (AOL) Instant Messenger (AIM) from AOL, Inc., Yahoo! Messenger from Yahoo! Inc., Gaim (available at gaim.sourceforge.net) and MSN Messenger from Microsoft Corporation. Further, an IM facility may be provided, e.g., in the e-mail server 110 or in another system (not shown) for containing instant messaging within an enterprise. Microsoft Windows Messenger and live Communications Server is an example of a suitable server with an instant messaging facility.

Figure 2:
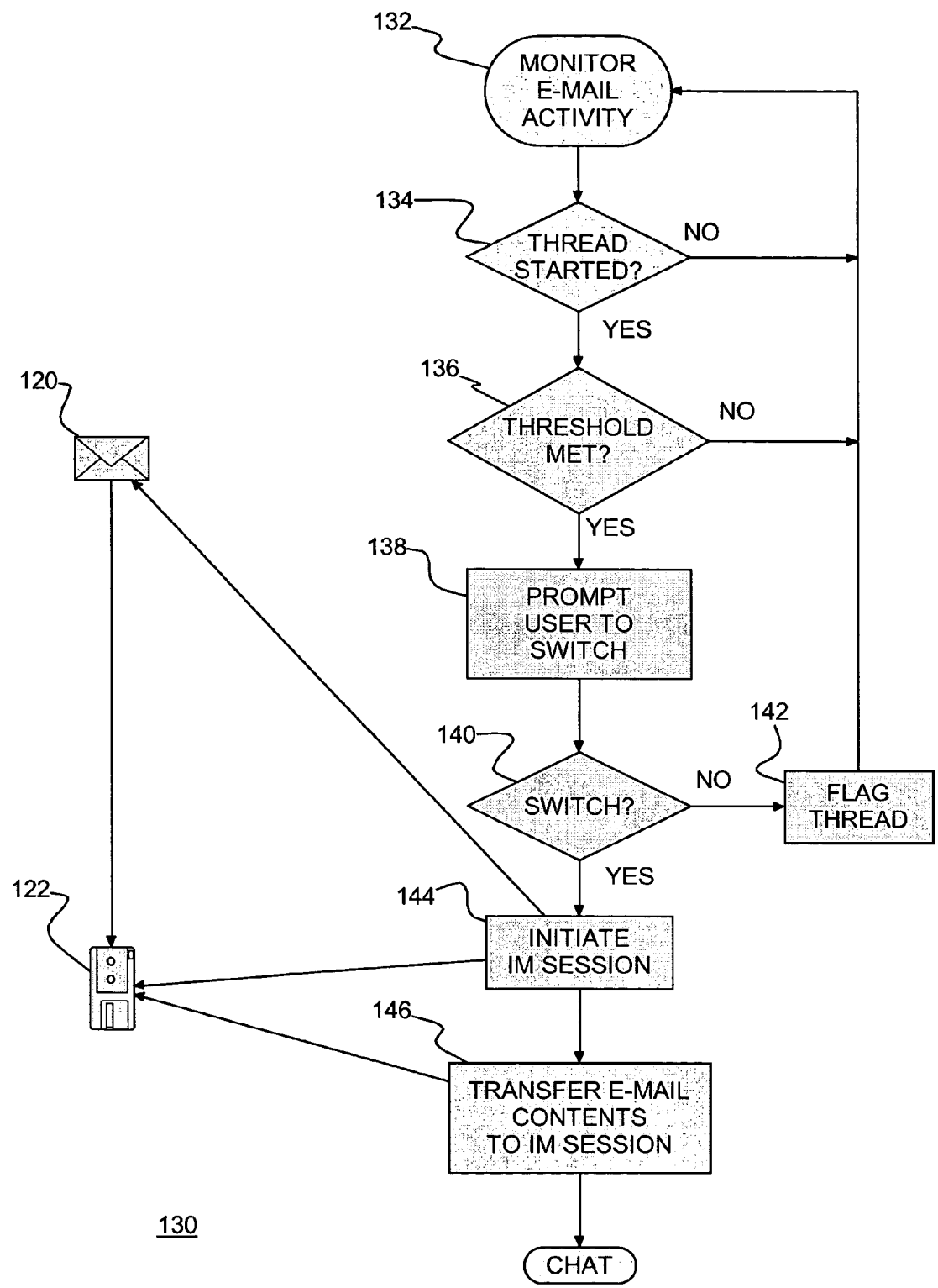
FIG. 2 shows a flow diagram of an example of operation of a preferred embodiment automated transition service that is resident on a user system.

FIG. 2 shows a flow diagrammatic example of operation of a preferred embodiment automated transition service 130 resident on a user system, e.g., 102 in FIG. 1. As noted hereinabove, a preferred user system 102 includes an e-mail capability 120 and an IM capability 122 cooperating with a preferred automated transition service 130 that monitors e-mail activity 132 for exchanges that may indicate the start of a conversation thread. Incoming and outgoing e-mail is checked in step 134 to determine if an exchange has occurred that may be the beginning of a thread, e.g., a local user simply selecting reply. If a thread has not yet started, monitoring continues in step 132 until a thread is recognized in step 134. Once a recognizable e-mail exchange has been identified in step 134 the exchange and any prior identified exchanges are checked in step 136 to determine if the exchange has met threshold requirements for a thread. Any suitable parameters may be selected to define threshold, e.g., a fairly rapid e-mail exchange or a more leisurely exchange of e-mails within a relatively short period of time. If the threshold has not been met, the exchange continues to be monitored in steps 132, 134 and 136. Once the threshold is met in step 136 for a monitored exchange, a prompt is provided in step 138 to notify the user that an IM exchange may be in order and the user is offered an opportunity to switch to an IM session. So, for example, the prompt may ask the user: "Would you like to transition this e-mail to an IM Session?" If the user declines in step 140, then the thread is flagged in step 142 and ignored thereafter. If, however, in step 140 the user responds affirmatively, opting to switch to an IM session, then an IM session 122 is initiated in step 144 and the e-mail participants are passed from the e-mail facility 120 to the IM session 122. The e-mail exchange contents are passed from the e-mail facility 120 to the IM session 122 in step 146 and the exchange continues as chat in an IM session 122.

So, for example, a user (sender) at a personal computer (e.g., 102 in FIG. 1) may send an e-mail message requesting project status, for example, to a remote user (recipient) at personal computer e.g., 118. The e-mail is stored on e-mail server 110, which makes a notification available to the recipient that is displayed on the remote user's personal computer 118, when the e-mail client on that personal computer 118 checks for e-mail, e.g., every 15 minutes. The remote user may respond with status and a request for additional resources. The remote user's (sender's) response is passed to the e-mail server 110 and relayed to the first user's (recipient's) personal computer 102, when the e-mail client on that personal computer 102 checks for e-mail, e.g., every 5 minutes. At this point, the preferred embodiment automated transition service 130 resident on whichever one or both of the systems 102, 108 has(have) been monitoring e-mail activity in step 132 of FIG. 2 and has(have) identified that an exchange has started in step 134 that may be a thread. The first user (recipient) can respond and ask additional questions. In this example each exchange may take at least 20 minutes. Normally, such a back and forth thread of exchanges might continue for several exchanges and over a couple of hours. Previously, perhaps after the second or third exchange, it might have occurred to one of the parties to switch to IM communications. However, once the switch to IM is effected, users might otherwise have been inconvenienced with searching through stored e-mails to decipher contextual statements or to match responses with questions.

By contrast, once an exchange in either or both of the communications devices (102 and/or 118 in this example) in a preferred embodiment-system 100 meets the threshold in step 136 for both incoming and outgoing e-mail for such threads; in step 138 that communications device 102 or 108 automatically suggests switching to an IM session, e.g., with an on-screen pop-up box. In step 140 at the user's option, the thread may be switched to an IM session 122 or continue as an e-mail exchange. Further, should the user decline the switch, at any point thereafter, the user may opt to switch to instant messaging unprompted, e.g., resetting the flag set in step 142. Since switching to an IM session might prove advantageous earlier in such an exchange for a user connected with a relatively slow connection, e.g., using a modem on an analog phone line, the threshold for suggesting such a switch in step 136 may be set much lower on such a system, e.g., 118. So, for example, a personal computer 102 on a high speed connection may suggest switching on the fourth or fifth exchange, where personal computer 118 may suggest switching on the second or third exchange. If the user selects switching, optionally the user may also select the particular IM communicator or protocol when the session is initiated in step 144. Once the IM session is started, the thread exchange is transferred to the new IM session in step 146 and the users can continue their conversation in the IM session 122.

Advantageously, a preferred embodiment automated transition service facilitates system resource management for optimum use of system resources. Users are prompted to switch to instant messaging for faster communications and when using e-mail might be unnecessary, thereby reducing unnecessary and absent minded system resources consumption for e-mail exchanges. Further, switching to IM sessions is seamless and, since the substance of the thread is automatically copied to the IM session, convenient and user friendly.

While the invention has been described in terms of preferred embodiments, those skilled in the art will recognize that the invention can be practiced with modification within the spirit and scope of the appended claims. For example, an embodiment of the invention may include computer program code stored thereon.

What is claimed is:

1. A real-time communications system comprising:
   a plurality of communications devices communicating with each other over a network;

at least two communications devices including an e-mail capability and an instant messaging (IM) capability operating on a common IM protocol; and one of said at least two communications devices monitoring e-mail exchanges, comprising incoming and outgoing e-mails, identifying e-mail message threads when said e-mail exchanges meet a messaging threshold, wherein said messaging threshold is the occurrence of said incoming and outgoing e-mails exchanged between at least two common e-mail addresses over a selected period of time, and in response to said email exchanges meeting said messaging threshold selectively providing an automatic prompt to switch an identified e-mail message thread to an IM session.

2. The real-time communications system as in claim 1, wherein upon a response to said prompt, said one initiates said IM session.

3. The real-time communications system as in claim 1, wherein said one of said at least two communications devices monitors for conversation threads of multiple e-mails with other users; and upon initiating said session, said one transfers the substance of said identified thread to said IM session.

4. The real-time communications system as in claim 1, wherein each of said plurality of communications devices include an e-mail capability and an IM capability.

5. The real-time communications system as in claim 4, wherein ones of said plurality of communications devices monitor local e-mail activity and identify e-mail message threads in said local e-mail activity and selectively provide a local prompt to switch an identified thread to an IM session, said one being one of said ones of said plurality of communications devices.

6. The real-time communications system as in claim 5, further comprising an e-mail server passing e-mails between connected ones of said plurality of communications devices.

7. The real-time communications system as in claim 6, further comprising an IM facility managing IM sessions between connected ones of said plurality of communications devices.

8. The real-time communications system as in claim 1, further comprising an e-mail server passing e-mails between connected ones of said plurality of communications devices.

9. The real-time communications system as in claim 1, further comprising an IM facility managing IM sessions between connected ones of said plurality of communications devices.

10. A method of managing system resources in a real-time communications system including a plurality of communications devices, said method comprising the steps of:
a) monitoring e-mail exchanges, comprising incoming and outgoing e-mails, on one of said plurality of communications devices;
b) identifying e-mail message exchange threads when said e-mail exchanges meet a messaging threshold, wherein said messaging threshold is the occurrence of said incoming and outgoing e-mails exchanged between at least two common e-mail addresses over a selected period of time;
c) automatically providing a prompt to switch to instant messaging (IM) on said one of said plurality of communications devices, said prompt being automatically provided in response to said e-mail exchanges meeting said messaging threshold; and
d) selectively initiating an IM session for said identified said e-mail message threads.

11. The method as in claim 10, wherein when the threshold has been met, an e-mail message thread is selected in step (c) comprising the steps of:
i) providing said prompt suggesting a switch to an IM session;
ii) receiving a response to said prompt, an affirmative response initiating said IM session in step (d).

12. The method as in claim 11, wherein step (d) comprises the steps of:
i) transferring the substance of the selected said e-mail message thread to the initiated said IM session; and
ii) continuing said e-mail message thread in said initiated IM session.

13. The method as in claim 12, wherein when a negative response is received in step (c)(ii), further comprises the step of:
iii) flagging the selected said e-mail exchange; and
iv) returning to step (a).

14. A computer program product for real time communications over devices networked together in real-time communications system, said computer program product comprising a computer usable medium having computer readable program code stored thereon, said computer readable program code comprising:
computer program code means for monitoring e-mail exchanges, comprising incoming and outgoing e-mails, on one of a plurality of communications devices;
computer program code means for identifying e-mail threads when said e-mail activity has met a messaging threshold, wherein said messaging threshold is the occurrence of incoming and outgoing said e-mails exchanged between at least two common e-mail addresses over a selected period of time;
computer program code means for instant messaging (IM);
computer program code means for automatically providing a prompt to switch to an IM session on said one of said plurality of communications devices, said prompt being automatically provided in response to said e-mail exchange meeting said messaging threshold; and
computer program code means for initiating said IM session for said identified e-mail threads.

15. The computer program product for real time communications as in claim 14, wherein said computer program code means for identifying e-mail threads comprises:
computer program code means for receiving a response to said prompt, said IM session being initiated responsive to receiving said response.

16. The computer program product for real time communications as in claim 14, wherein said computer program code means for instant messaging comprises computer program code means for instant messaging in a plurality of IM protocols and said computer program code means for identifying e-mail threads comprises:
computer program code means for selecting one of said plurality of IM protocols and transferring the substance of an identified thread to an initiated said IM session.

17. A computer-readable medium having stored thereon a plurality of instructions, the plurality of instructions including instructions which, when executed by a processor, cause the processor to:
a) monitor e-mail exchanges, comprising incoming and outgoing e-mails, on one of a plurality of communications devices;
b) identify e-mail conversation threads in monitored said e-mail exchanges when said e-mail exchanges meet a messaging threshold, wherein said messaging threshold is the occurrence of said incoming and outgoing e-mails exchanged between at least two common e-mail addresses over a selected period of time;

c) automatically provide a prompt to switch to instant messaging (IM) on said one of said plurality of communications devices, said prompt being automatically provided in response to said e-mail exchanges meeting said messaging threshold; and d) selectively initiate an IM session for said e-mail conversation thread.

18. The computer-readable medium as in claim 17, wherein the step (d) of selectively initiating an IM session causes the processor to initiate said IM session in response to an affirmative response to said prompt.

19. The computer readable medium as in claim 18, wherein initiating said IM session causes the processor to transfer the substance of the selected said e-mail conversation thread to the initiated said IM session.

20. The computer-readable medium as in claim 18, wherein a negative response to said prompt causes the processor to flag the selected said e-mail conversation thread, and resetting said flag causes the processor to continue monitoring in step (a) and identifying e-mail conversation threads in step (b).

* * * * *